US008789247B2

(12) United States Patent
Tanaka et al.

(10) Patent No.: US 8,789,247 B2
(45) Date of Patent: Jul. 29, 2014

(54) INTERLOCK TOOL, BAG MAKING USE THEREOF AND PROCESS FOR PRODUCING THEM

(75) Inventors: Kenichi Tanaka, Sodegaura (JP); Shuichi Goto, Chuo-ku (JP)

(73) Assignee: Idemitsu Unitech Co., Ltd., Tokyo (JP)

( * ) Notice: Subject to any disclaimer, the term of this patent is extended or adjusted under 35 U.S.C. 154(b) by 795 days.

(21) Appl. No.: 12/092,870

(22) PCT Filed: Nov. 6, 2006

(86) PCT No.: PCT/JP2006/322073
§ 371 (c)(1),
(2), (4) Date: May 7, 2008

(87) PCT Pub. No.: WO2007/055161
PCT Pub. Date: May 18, 2007

(65) Prior Publication Data
US 2009/0119889 A1 May 14, 2009

(30) Foreign Application Priority Data
Nov. 8, 2005 (JP) .................. 2005-323190

(51) Int. Cl.
*A44B 19/16* (2006.01)
*B29D 5/10* (2006.01)
*B31B 1/90* (2006.01)
*B65D 33/28* (2006.01)
*B65D 33/25* (2006.01)
*B29C 47/12* (2006.01)
*B29C 47/00* (2006.01)
*B29C 47/06* (2006.01)

(52) U.S. Cl.
CPC ........ *B65D 33/2508* (2013.01); *B65D 33/2516* (2013.01); *B29C 47/128* (2013.01); *B29D 5/10* (2013.01); *B29C 47/003* (2013.01); *B65D 33/2541* (2013.01); *B65D 33/2558* (2013.01); *B29C 47/067* (2013.01); *B29C 47/0033* (2013.01)
USPC ............... 24/399; 24/400; 24/30.5 R; 383/63; 383/64; 493/211; 493/214

(58) Field of Classification Search
CPC ...... B29D 5/10; B65D 33/2508; B65D 66/25; B65D 33/2591; B29C 47/003; B29C 47/067; B29C 47/128
USPC ................ 24/30.5 R, 399, 400, 584.1, 585.1, 24/585.12, 591.1, 593.1, DIG. 39, DIG. 50; 383/64
See application file for complete search history.

(56) References Cited

U.S. PATENT DOCUMENTS 3,440,696 A * 4/1969 Staller .......................... 24/586.1
4,690,862 A 9/1987 Hoffmann
(Continued)

FOREIGN PATENT DOCUMENTS

JP 60-187609 U 12/1985
JP 2000-255596 A 9/2000
(Continued)

OTHER PUBLICATIONS
Supplementary European Search Report of EP 06 82 2987 (Oct. 26, 2009).
(Continued)

Primary Examiner — Robert J Sandy
(74) Attorney, Agent, or Firm — Millen, White, Zelano & Branigan, P.C.

(57) ABSTRACT

A zipper in which a male member having a male interlocking section and a female member having a female interlocking section that fits with the male interlocking section are peelable and re-fittable is provided. The male member and the female member are formed by different resins, and at least the male interlocking section and the female interlocking section are peelably adhered or contacted with each other with substantially no gap.

12 Claims, 8 Drawing Sheets

(56) References Cited

U.S. PATENT DOCUMENTS

| | | | |
|---|---|---|---|
| 4,736,496 A * | 4/1988 | Fisher et al. | 24/585.12 |
| 4,791,710 A * | 12/1988 | Nocek et al. | 24/585.12 |
| 4,947,525 A * | 8/1990 | Van Erden | 24/304 |
| 5,138,750 A * | 8/1992 | Gundlach et al. | 24/585.12 |
| 5,351,369 A * | 10/1994 | Swain | 24/304 |
| 5,356,222 A * | 10/1994 | Kettner et al. | 383/63 |
| 5,664,296 A * | 9/1997 | May | 24/30.5 R |
| 6,045,264 A | 4/2000 | Miniea | |
| 6,131,248 A * | 10/2000 | Tomic | 24/304 |
| 6,185,796 B1 * | 2/2001 | Ausnit | 24/585.1 |
| 6,625,851 B1 * | 9/2003 | Martin et al. | 24/462 |
| 7,171,730 B2 * | 2/2007 | Kasai | 24/30.5 R |
| 7,255,477 B2 * | 8/2007 | Arnell | 383/64 |
| 7,290,660 B2 * | 11/2007 | Tilman et al. | 206/524.8 |
| 7,316,052 B2 * | 1/2008 | Pawloski et al. | 24/585.12 |
| 7,316,101 B1 * | 1/2008 | Nguyen et al. | 53/408 |
| 7,585,111 B2 * | 9/2009 | Turvey et al. | 383/63 |
| 7,765,649 B2 * | 8/2010 | Katada et al. | 24/30.5 R |
| 7,857,515 B2 * | 12/2010 | Dais et al. | 383/59 |
| 7,914,208 B2 * | 3/2011 | Sprehe | 383/63 |
| 8,196,269 B2 * | 6/2012 | Dais et al. | 24/400 |
| 8,481,135 B2 * | 7/2013 | Nakajima et al. | 428/35.7 |
| 2004/0091186 A1 * | 5/2004 | Shibata | 383/210 |
| 2004/0165794 A1 * | 8/2004 | Plourde et al. | 383/64 |
| 2006/0048483 A1 * | 3/2006 | Tilman et al. | 53/434 |
| 2006/0168774 A1 * | 8/2006 | Pawloski et al. | 24/399 |
| 2006/0168775 A1 * | 8/2006 | Turvey et al. | 24/399 |
| 2006/0171609 A1 * | 8/2006 | Turvey et al. | 383/63 |
| 2007/0266532 A1 * | 11/2007 | Katada et al. | 24/399 |
| 2007/0289108 A1 * | 12/2007 | Plourde et al. | 24/399 |
| 2008/0031552 A1 * | 2/2008 | Tanaka et al. | 383/63 |
| 2009/0022435 A1 * | 1/2009 | Tanaka et al. | 383/210.1 |
| 2009/0119889 A1 * | 5/2009 | Tanaka et al. | 24/399 |
| 2009/0300891 A1 * | 12/2009 | Nanba et al. | 24/399 |

FOREIGN PATENT DOCUMENTS

| | | |
|---|---|---|
| JP | 2004-155458 A | 6/2004 |
| JP | 2004-168420 A | 6/2004 |

OTHER PUBLICATIONS

Office Action related to Korean Patent Application No. 2008-7013646 dated Feb. 27, 2013.

English language translation of Office Action related to Korean Patent Application No. 2008-7013646 dated Feb. 27, 2013.

Japanese Patent Abstract No. 2000-255596; dated Sep. 19, 2000; Hosokawa Yoko Co. Ltd.

* cited by examiner

INTERLOCK TOOL, BAG MAKING USE THEREOF AND PROCESS FOR PRODUCING THEM

TECHNICAL FIELD

The present invention relates to a zipper, a bag using the zipper, and a manufacturing method of the zipper and the bag. Specifically, the present invention relates to a zipper in which a male member having a male interlocking section and a female member having a female interlocking section can be peeled from and re-fitted with each other, a bag using the zipper, and a manufacturing method using the zipper and the bag.

BACKGROUND ART

A zipper tape that can be re-sealed after having been opened is utilized for a bag (package bag) for foods, medicine, and miscellaneous goods.

A conventional zipper tape is constituted by a male member having a male interlocking section and a female member having a female interlocking section which is fitted with the male interlocking section, each member being separately extruded before being attached to the bag in an interlocked state.

As a consequence, a conventional bag with the zipper tape has not exhibited satisfactory sealing performance, and further, it has been impossible for a user to confirm that the zipper tape has not been opened in advance or that the bag has not been tampered.

Thus, as a way of improving the sealing performance and preventing the tampering, a structure in which an opening of the bag is heat-sealed has been proposed. However, the structure bothers a user to cut the opening of the bag with a cutting tool, unless an easy means of ripping otherwise is provided.

One bag that has been proposed to allow the user to unseal without a cutting tool or the like is a package bag with a zipper tape disclosed in Patent Document 1 (see, Patent Document 1).

In this package bag with a zipper tape, a male member having a male interlocking section and a female member having a female interlocking section are separately molded from synthetic resins different from each other. The male and female members are heat-sealed onto an inside of the opening of the bag, and at the same time, the facing sides of the male member and the female member are bonded with a relatively small heat-seal strength.

Patent Document 1: JP-A-2004-155458

DISCLOSURE OF THE INVENTION

Problems to be Solved by the Invention

In a package bag with a zipper tape disclosed in Patent Document 1, since facing sides of a male member and a female member are bonded with a relatively small heat-seal strength, unsealing does not require a cutting tool or the like.

However, since it is necessary that the male member and the female member be heat-sealed in an interlocked state onto the opening of the bag and at the same time the facing sides of the male member and the female member be heat-sealed with a small heat-seal strength, in other words, two portions need to be simultaneously heat-sealed with different strengths while the facing sides of the male member and the female member need to be heat-sealed with a strength allowing peeling by hand, satisfactory sealing performance is not guaranteed of the resulting bag.

Further, in this package bag with a zipper tape, since a gap is formed between the male interlocking section and the female interlocking section, these male and female interlocking sections are deformed on heat-sealing of the male and female members to the bag body, so that sealing performance in the case of re-sealing may be unsatisfactory, too.

Furthermore, since heat-seal portions of the male member and the female member, that is, unsealing portions, are provided in addition to the interlocking sections, that is, the male interlocking section and the female interlocking section, widths of these members are enlarged, thereby being unsuitable for compact bags.

An object of the present invention is to provide a zipper in which sealing performance is guaranteed and a bag using the zipper.

Another object of the present invention is to provide a manufacturing method of a zipper and a bag which is, in addition to the above advantage, invulnerable to tampering.

Means for Solving the Problems

A zipper according to an aspect of the present invention includes: a male member having a male interlocking section and a female member having a female interlocking section that fits with the male interlocking section, in which the male member and the female member are peelable and re-fittable, and at least the male interlocking section and the female interlocking section are peelably adhered or contacted with each other with substantially no gap.

Here, "peelably adhered" refers to a state of adherence that allows the male interlocking section and the female interlocking section to be peeled apart by hand. For example, if the zipper according to the present invention is provided to an unsealing portion of the bag body, an ordinary "adhesion" of the male interlocking section and the female interlocking section would make it difficult to unseal by hand. Even if unsealing were possible, a portion of the bag body or the zipper would be ripped or would suffer from deformation such as a stretch, possibly causing deterioration in appearance or in re-fitting and re-unsealing performance. The "peelable adhesion" includes adhesion at a value between and including 50 N/50 mm and 25 N/50 mm, though a value below 25 N/50 mm is permissible as far as problems such as the interlocking sections opening during transportation do not arise.

Also in the zipper according to the present invention, even if the male interlocking section and the female interlocking section were not adhered at all, in other words, even if the interlocking sections were contacted with each other with substantially no gap, problems such as the interlocking sections opening during transportation and the like would be prevented by providing an undercut to the male interlocking section and the female interlocking section in a direction in which the interlocking sections are opened.

With the zipper according to the present invention, since the male interlocking section and the female interlocking section are peelably adhered or contacted substantially without a gap, high sealing performance can be achieved and proper peeling performance, such as being capable of being peeled by hand, can be achieved, too.

In addition, since there is substantially no gap between the male interlocking section and the female interlocking section, for example, deformation is prevented upon fusing the interlocking sections to the bag body. Therefore, high sealing performance is ensured.

Furthermore, since the male interlocking section and the female interlocking section serve also as the unsealing portion, the width dimension need not be large, so that the zipper is suitable for small bags.

In the above arrangement, the male member and the female member preferably are formed of resins different from each other.

Here, the "different resins" refer to chemically different kinds of resins. If a material that forms at least one of the male member and the female member includes a composition or a copolymer, a component occupying 50 mass percent or more of the composition or the copolymer (major component) belongs to a chemically different kind with respect to a major component of a composition or a copolymer that forms the other of the male member and the female member.

For example, polypropylene and polyethylene are different resins, and polypropylene and an ethylene-propylene copolymer (a propylene unit of no more than 50 mass percent) are different resins. Polypropylene and a composition of polypropylene and polyethylene (PP of no less than 50 mass percent) are not different resins.

With this arrangement, since the male member and the female member are formed of different resins, the male interlocking section and the female interlocking section can be peelably adhered with substantially no gap. For example, when the male member and the female member are integrally molded from different resins in an interlocked state, each of the different resins is formed into a desired profile in a manner closely contacting with each other while preserving interface between the different resins. After having been integrally molded, the resin that forms the male member and the resin that forms the female member are peelably adhered, the "peelably adhered" referring to being adhered at a surface layer to a surface layer of a different resin, so that peelable adherence is obtained simultaneously with the molding.

Incidentally, methods of integrally molding include coextrusion and multistage extrusion.

In the above arrangement, the male member preferably includes a belt-like base having a bonding surface and a male interlocking section formed along a belt-wise direction in a manner integrated with and protruding from a surface on a side opposite to the bonding surface of the belt-like base, the female member preferably includes a belt-like base having a bonding surface and a groove-shaped female interlocking section formed along a belt-wise direction in a manner integrated with and protruding from a surface on a side opposite to the bonding surface of the belt-like base, and no less than 60% of a surface of the male member excluding the bonding surface of the male member preferably is contacted with substantially no gap with a surface of the female member excluding the bonding surface of the female member.

With this arrangement, since no less than 60% of a surface of the male member excluding the bonding surface of the male member is contacted with substantially no gap, with a surface of the female member excluding the bonding surface of the female member, high sealing performance is achieved. The contacting area of the surface of the male member, the bonding surface of the male member being excluded from the surface, may be 60 percent or more, preferably 70 percent or more, or further preferably 90 percent or more.

In the above arrangement, a cross section of the male interlocking section preferably is substantially the same as a groove cross section of the female interlocking section.

With this arrangement, since the cross section of the male interlocking section and the groove cross section of the female interlocking section are substantially the same, an interlocked state in which the male member and the female member are contacted with no gap can be obtained. Therefore, since no gap is formed between the interlocking sections, higher sealing performance can be achieved.

In the above arrangement, a surface of the belt-like base of the male member on the side opposite to the bonding surface preferably is contacted with at least a portion of the female interlocking section of the female member.

With this arrangement, since the surface of the belt-like base of the male member on the side opposite to the bonding surface is contacted with at least a portion of the female interlocking section of the female member, a contacting area of the male interlocking section and the female interlocking section is joined by a contacting area of the belt-like base of the male member and the female interlocking section of the female member to increase a contacting area of the male member and the female member, so that higher sealing performance is achieved.

Here, the female interlocking section may preferably be contacted with the vicinity of the male interlocking section of the male member, and may further preferably be contacted with portions adjacent to and on both sides of the male interlocking section.

In the above arrangement, a peeling starting section preferably is formed at a boundary surface where the surfaces of the male member and the female member abut with each other.

With this arrangement, upon peeling the male member and the female member apart, a force applied in a direction to split the male member and the female member apart is concentrated at the peeling starting section, thereby facilitating peeling.

In the above arrangement, the peeling starting section preferably is a groove provided to one of boundary surfaces where the surfaces of the male member and the female member abut with each other.

The groove that constitutes the peeling starting section may be formed in the same length as the belt-wise direction (longitudinal direction) of the zipper, but may also be formed intermittently in the belt-wise direction (longitudinal direction) of the zipper. Examples of a shape of the groove include V-shaped, rectangular, and the like, but the groove may take any suitable shape.

With this arrangement, the peeling starting section can be formed in a simple arrangement. The peeling starting section can be formed simultaneously with formation of the male member and the female member.

In the above arrangement, the peeling strength of the male member and the female member preferably is between and including 50 N/50 mm and 25 N/50 mm.

With this arrangement, peeling is conducted by hand with ease. When the peeling strength is over 50 N/50 mm, peeling by hand is difficult, so that the peeling strength may preferably be no more than 35 N/50 mm. On the contrary, if the peeling strength is too low, the transportation process possibly causes an improper unsealing, so that the peeling strength may preferably be no less than 25 N/50 mm.

In the above arrangement, one of the male member and the female member preferably is formed of an ethylene-based polymer and the other is formed of a propylene-based polymer.

With this arrangement, since the ethylene-based copolymer, which possesses outstanding flexibility, and the propylene-based copolymer, which is low in flexibility, are employed, the male member and the female member are readily peeled and the sealing performance is enhanced. Specifically, with regards to the peeling and re-fitting of the male member and the female member, it is preferable that the female member, which is subject to a significant deformation, be formed of the ethylene-based copolymer possessing outstanding flexibility and the male member be formed of the propylene-based copolymer.

In the above arrangement, a seal layer preferably is provided to a side of the bonding surface of each of the male member and the female member.

With this arrangement, since the male member and the female member are provided with the seal layers, the male member and the female member made of the different resins have little difficulty being fused onto the bag body made of a material of the same chemical kind as one of the members.

A bag according to the present invention includes the zipper of any one of the above arrangements, the zipper being provided to an opening of a bag body.

With this arrangement, a bag that provides the above described effects can be obtained.

A manufacturing method of a zipper according to an aspect of the present invention includes molding a male member having a male interlocking section and a female member having a female interlocking section that fits with the male interlocking section, the male member and the female member being provided by different resins and being integrally molded in an interlocked state.

A manufacturing method of a bag according to an aspect of the present invention includes a zipper molding process in which molding a male member having a male interlocking section and a female member having a female interlocking section that fits with the male interlocking section, the male member and the female member being provided by different resins and being integrally molded in an interlocked state and a bag fabricating process in which the zipper molded in the zipper molding process is heat-fused or adhered onto an opening of a bag body in a continued interlocked state to form the bag.

Here, resins possessing low compatibility may be selected as the different resins.

With these arrangements, when the male member having the male interlocking section and the female member having the female interlocking section that fits with the male interlocking section are integrally molded out of different resins in an interlocked state, each of the different resins are formed into a desired profile in a manner closely contacting with each other while preserving interface therebetween. After having been integrally molded, the resin that forms the male member and the resin that forms the female member are peelably adhered, that is, being adhered at a surface layer to a surface layer of a different resin, so that high sealing performance can be obtained, thereby allowing a user to peel apart the male member and the female member with a suitable force.

When the male member and the female member are re-fitted and re-unsealed, a strength determined at a value that allows unsealing with a force smaller than a force required for peeling after the molding enables to distinguish between the first peeling occasion and the re-unsealing occasion on account of the smaller required strength necessary in unsealing for the second time and henceforth. Therefore, tampering is expected to be prevented.

BEST MODE FOR CARRYING OUT THE INVENTION

Embodiments of the present invention will be described below with reference to the drawings.
(First Embodiment)

Figure 1:
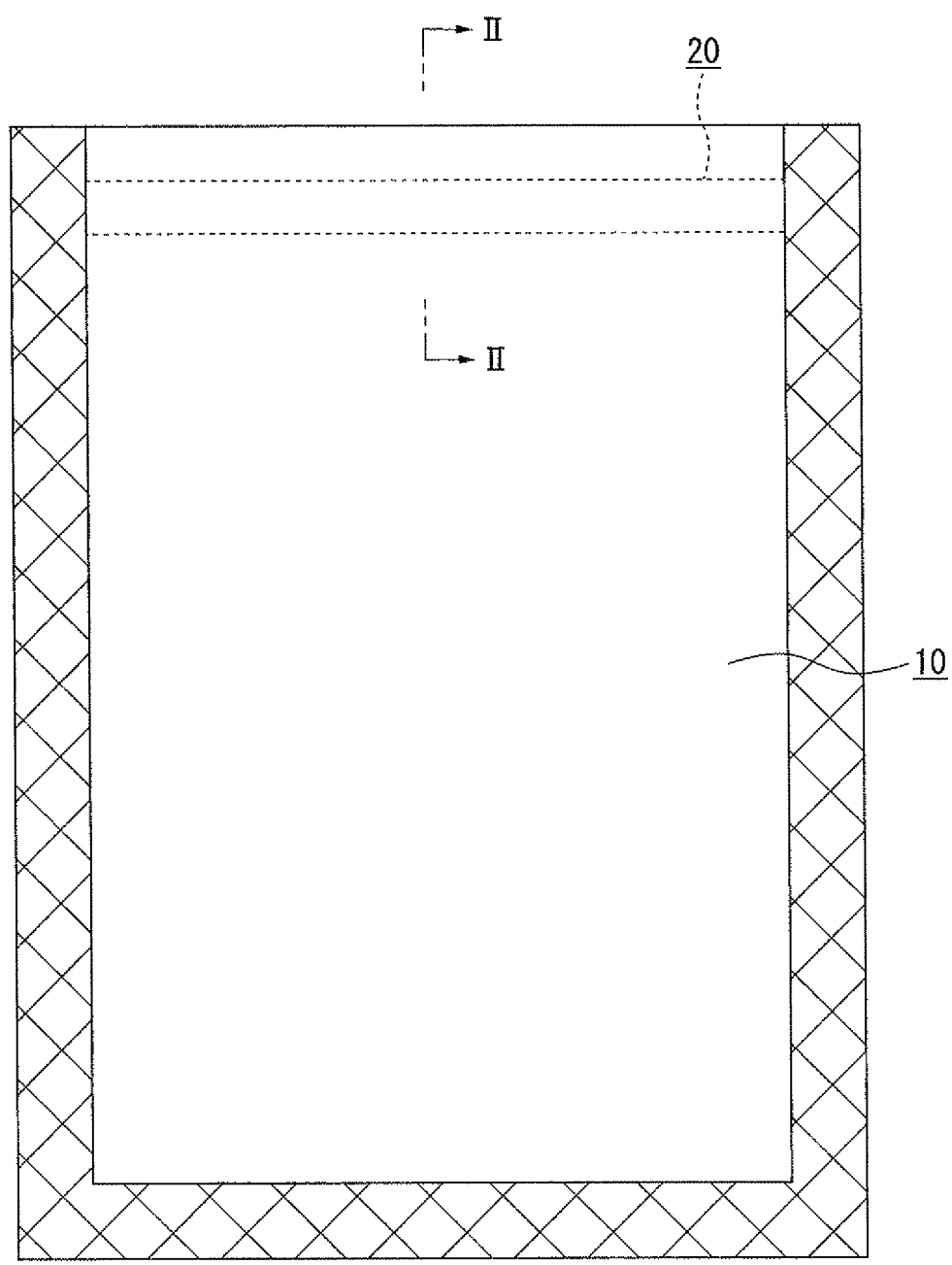
FIG. 1 is a front view showing a bag according to a first embodiment of the present invention.
Figure 2:
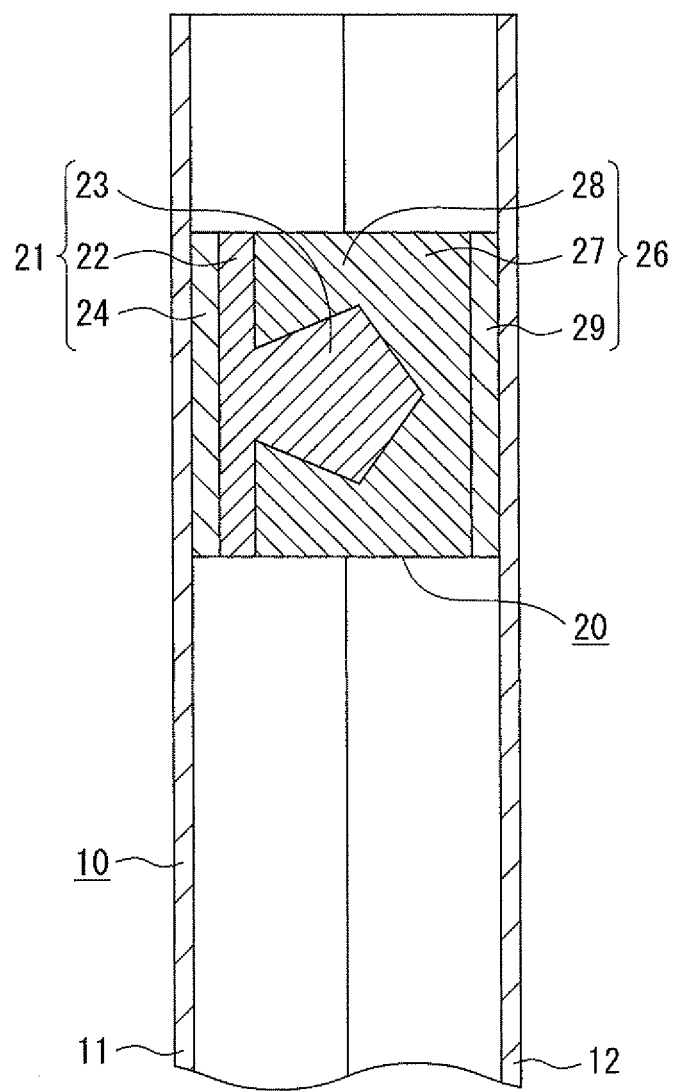
FIG. 2 is a sectional view of the embodiment taken along a II-II line.
Figure 3:
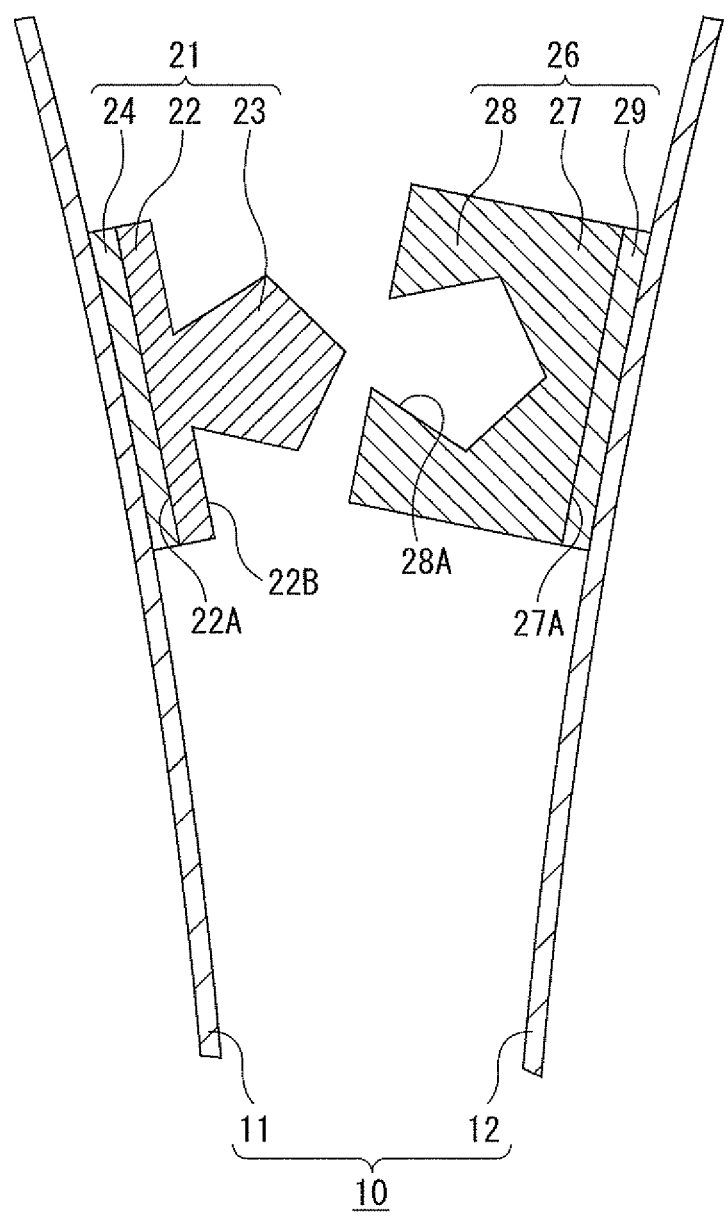
FIG. 3 is a sectional view showing the bag according to the embodiment in an unsealed state.

A first embodiment of the present invention is shown in FIGS. 1 to 3. FIG. 1 is a front view of a bag according to the first embodiment. FIG. 2 is a sectional view taken along a II-II line in FIG. 1. FIG. 3 is a sectional view of the bag in an unsealed state.

The bag according to the first embodiment includes a bag body 10 and a zipper 20 attached to an opening (unsealing portion) of the bag body 10.

Two planar rectangular films 11 and 12, one for a first side of the bag and another for a second side, are bonded (heat-sealed) with each other at peripheries (sides) thereof to form the bag body 10.

The films 11 and 12 are single layered linear low density polyethylene (LLDPE) films, which are manufactured by known methods such as a casting method, a melt extrusion method, a calendar method, and the like. Incidentally, whereas the embodiment employs single layered structure for the films 11 and 12, the films 11 and 12 may also be laminated by an outer layer of oriented nylon (ONY), oriented polypropylene (OPP), or oriented polyethylene terephthalate (OPET) and a sealant layer of linear low density polyethylene (LLDPE), casted polypropylene (CPP), or the like.

The zipper 20 includes a male member 21 and a female member 26. The male member 21 and the female member 26, integrally formed in an interlocked state, are capable of being peeled and re-fitted.

The male member 21 includes a belt-like base 22 having a bonding surface 22A, a male interlocking section 23 formed along a belt-wise direction in a manner integrated with and protruding from a surface 22B of the belt-like base 22 on a side opposite to the bonding surface 22A, and a seal layer 24 provided to the bonding surface 22A of the belt-like base 22.

The male interlocking section 23 is formed at a widthwise center of the belt-like base 22. As a distance from the surface (surface 22B) of the belt-like base 22 increases, a width of the male interlocking section 23 increases in a tapered manner before decreasing in a tapered manner. In short, the male interlocking section 23 has a pentagonal cross section. The seal layer 24 has a uniform thickness and has a width substantially the same as the width of the belt-like base 22.

The female member 26 includes a belt-like base 27 having a bonding surface 27A, a female interlocking section 28 formed along a belt-wise direction in a manner integrated with a surface of the belt-like base 27 on a side opposite to the bonding surface 27A, and a seal layer 29 provided on the bonding surface 27A of the belt-like base 27.

The female member 28 has a rectangular cross section with a width substantially the same as the width of the belt-like base 27 and is provided with an interlocking groove 28A that has a cross section substantially the same as the cross section of the male interlocking section 23 (pentagonal cross section) on a distal side of the female interlocking section 28. The seal layer 29 has a uniform thickness and has a width substantially the same as the width of the belt-like base 27.

Thus, the male interlocking section 23 of the male member 21 and the female interlocking section 28 of the female member 26 are contacted with each other with no gap, and the surface 22B on the side opposite to the bonding surface 22A of the belt-like base 22 of the male member 21 and a distal surface of the female interlocking section 28 of the female member 26 are contacted with each other without a gap. In other words, 90% or more of the surface of the male member excluding the bonding surface 22A of the male member 21 is contacted with substantially no gap with the surface of the female member excluding the bonding surface 27A of the female member 26. Therefore, the male member 21 and the female member 26 in an interlocked state have a rectangular cross section with no empty space thereinside.

Here, the belt-like base 22 and the male interlocking section 23 that constitute the male member 21 are integrally molded from a resin different from the belt-like base 27 and the female interlocking section 28 that constitute the female member 26. Specifically, the different resins are an ethylene-based polymer and a propylene-based polymer. Regarding the male member 21 and the female member 26 of the embodiment, the female member 26 is molded from an ethylene-based polymer and the male member 21 is molded from a propylene-based polymer.

Examples of an ethylene-based polymer include a low density polyethylene, a linear low density polyethylene (LLDPE), and the like. Preferred propylene-based polymers include a polypropylene-based copolymer of polypropylene and ethylene, a homo-polypropylene, a polyolefin thermoplastic elastomer (TPO), and the like.

The seal layers 24 and 29 are provided to fuse the male member 21 and the female member 26 formed of the different resins on the same bag body 10.

In the case of employing an ethylene-based polymer and a propylene-based polymer to form the female member 26 and the male member 21, Metallocene LL is preferred for the seal layers 24 and 29.

Specifically, 50 to 100 weight percent is occupied by Metallocene LL having a density of no more than 905 kg/m$^3$ and an MFR of no more than 5 g/10 min, and the remaining 50 to 0 weight percent is occupied by Metallocene LL having a density of no more than 905 kg/m$^3$ and an MFR of more than 5 g/10 min or propylene-based copolymer of propylene and butane-1.

Next, a manufacturing method of the bag according to the embodiment will be described.

Upon manufacturing the bag, the zipper 20 is initially obtained in a zipper molding process, and thereafter the bag is manufactured in the bag fabricating process.

In the zipper molding process, the male member 21 and the female member 26 are integrally molded of different resins in an interlocked state to obtain the zipper 20.

Specifically, a propylene-based copolymer (the resin that forms the belt-like base 22 and the male interlocking section 23 of the male member 21), an ethylene-based copolymer (the resin that forms the belt-like base 27 and the female interlocking section 28 of the female member 26), and Metallocene LL (the resin that forms the seal layers 24 and 29) are coextruded by three extruders to obtain the zipper 20 in which the male member 21 and the female member 26 are in an interlocked state.

In the bag fabricating process, the zipper 20 molded in the zipper molding process is heat-fused or adhered on the opening of the bag body 10 in a continued interlocked state.

Specifically, the zipper 20 molded in the zipper molding process is heat-fused onto the openings (the unsealing portions) of the single layered films 11 and 12 of linear low density polyethylene (LLDPE) in a continued interlocked state and the other three sides are heat-fused to obtain the bag.

In the bag obtained this way, since the male member 21 and the female member 26 which have been heat-fused or adhered on the opening of the bag body 10 are integrally molded in an interlocked state, the resin forming the male member 21 and the resin forming the female member 26 are adhered at surface layer portions of the different resins, in other words, are in a so-called peelable adhesion state, so that, while achieving high sealing performance, a user can peel the male member 21 and the female member 26 with a moderate force. In this case, a peel-strength of the male member 21 and the female member 26 is between and including 50 N/50 mm and 25 N/50 mm.

In the case of the male member 21 and the female member 26 being unsealed again after having been re-fitted, a strength is arranged (to be about the same as a conventional zipper, namely around 5 to 40 N/50 mm) to allow unsealing with a smaller force than the force required in the peeling after molding. In other words, since the strength in the initial peeling and the strength in subsequent unsealing are varied, the first peeling occasion can be distinguished from the subsequent unsealing occasions. Therefore, tampering is expected to be prevented.

(Modifications)

Figure 4:
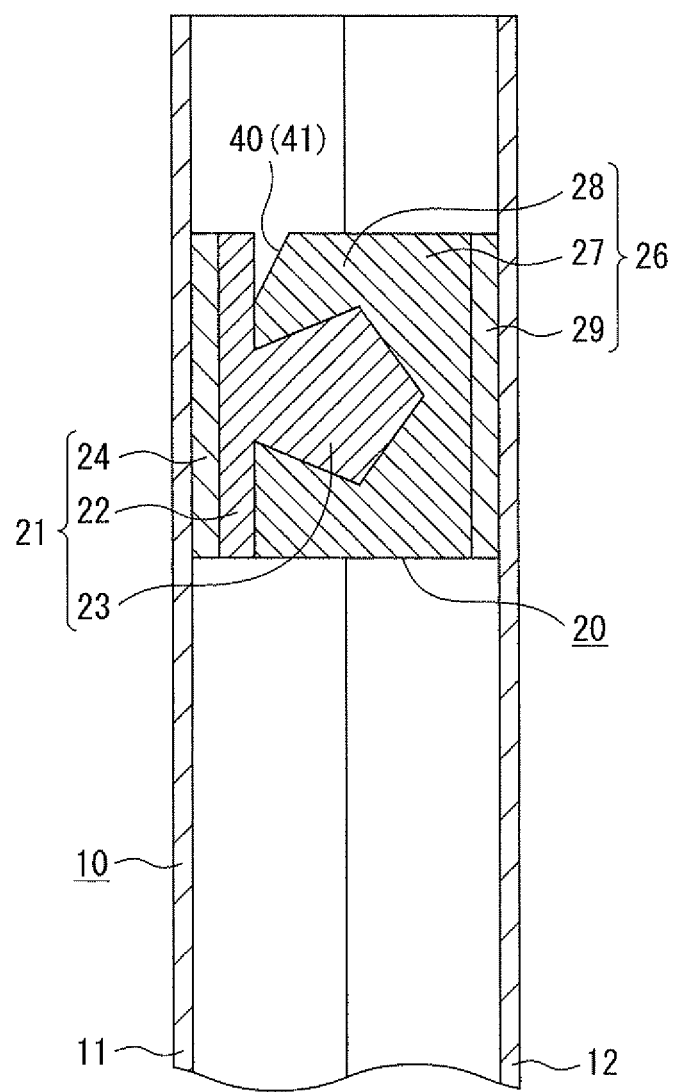
FIG. 4 is a sectional view showing a modification 1 of the embodiment.

In the above-described embodiment, a peeling starting section may be provided to a boundary surface where surfaces of the male member 21 and the female member 26 abut with each other. For example, as shown in FIG. 4, seen in a widthwise cross section of the zipper 20, the peeling starting section 40 may be formed in a widthwise direction perpendicular to a belt-wise direction of the zipper 20 (on a side of an unsealing end) at a boundary surface, where the surfaces of the male member 21 and the female member 26 abut with each other.

Figure 5:
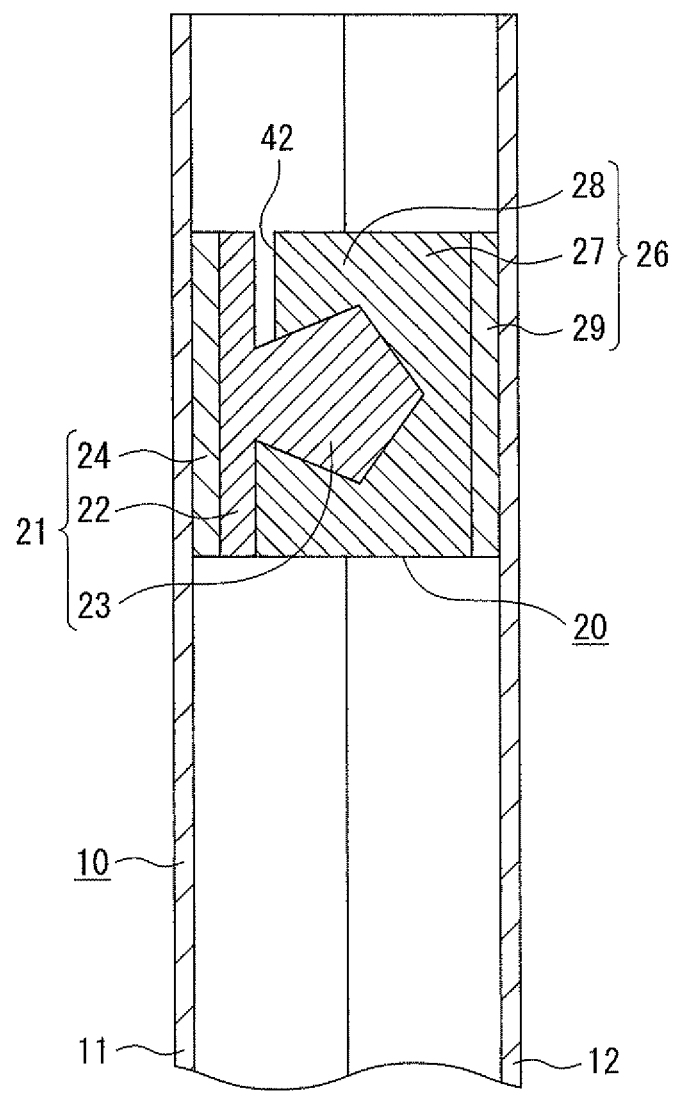
FIG. 5 is a sectional view showing a modification 2 of the embodiment.

The peeling starting section 40 is provided by forming a V-shaped groove 41 in one of the boundary surfaces where the surfaces of the male member 21 and the female member 26 abut with each other, in the female interlocking section 28 of the female member 26 in this modification. Further, as shown in FIG. 5, a rectangular groove 42 may be formed in one of the boundary surfaces where the surfaces of the male member 21 and the female member 26 abut with each other, for example, in the female interlocking section 28 of the female member 26.

If the peeling starting section 40 is provided, peeling forces applied to the films 11 and 12 that constitute the bag body 10 are concentrated at the peeling starting section 40, thereby facilitating peeling by hand.

Incidentally, the V-shaped groove 41 and the rectangular groove 42 that constitute the peeling starting section 40 may be formed in the same length as the belt-wise direction (longitudinal direction) of the zipper 20, but may also be formed intermittently in the belt-wise direction (longitudinal direction) of the zipper 20.

A corner of the male interlocking section 23 of the male member 21 may be spaced apart from the surface of the interlocking groove 28A of the female interlocking section 28 on account of shrinkage after molding. Alternatively, a portion of the male interlocking section 23 that constitutes an undercut may be spaced apart from the surface of the female interlocking section 28 toward the unsealing direction of the zipper as far as the sealing performance is not defected. In other words, as far as 60 percent or more of the surface of the male member 21 excluding the bonding surface 22A of the male member 21 is contacted with substantially no gap with the surface of the female member excluding the bonding surface 27A, a non-contacting portion due to shrinkage after molding may be formed, or a non-contacting portion may be provided by arranging the portion of the male interlocking section 23 that constitutes the undercut to be spaced apart from the surface of the female interlocking section 28 in the unsealing direction of the zipper.

(Second to Fourth Embodiments)

Figure 6:
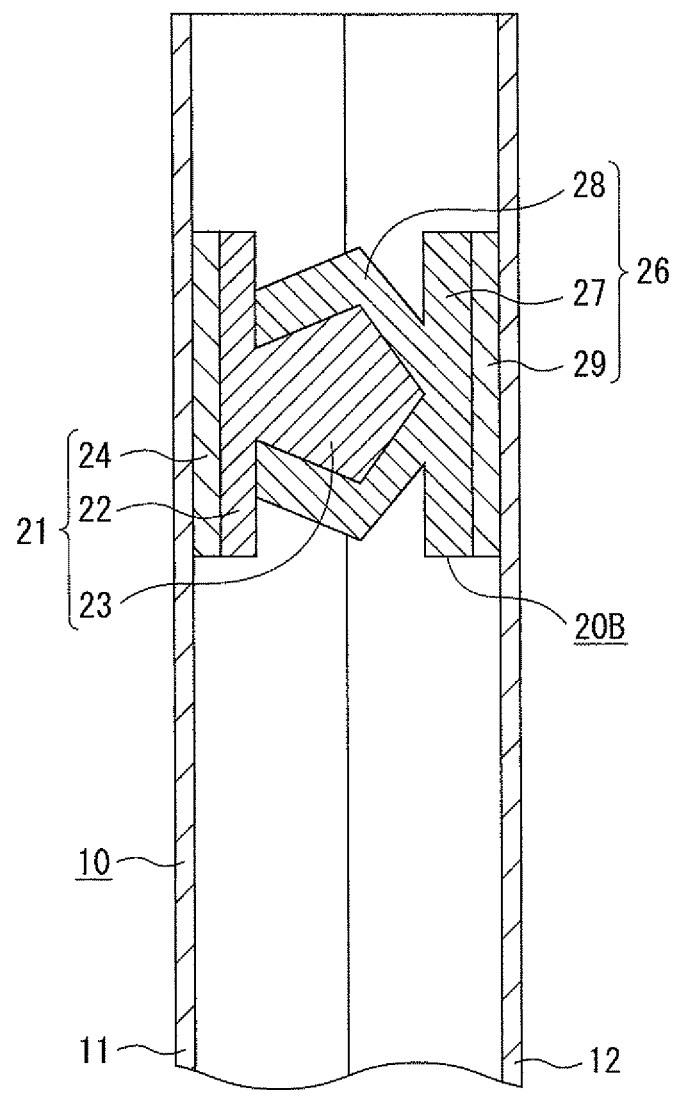
FIG. 6 is a sectional view showing a second embodiment of the present invention.
Figure 7:
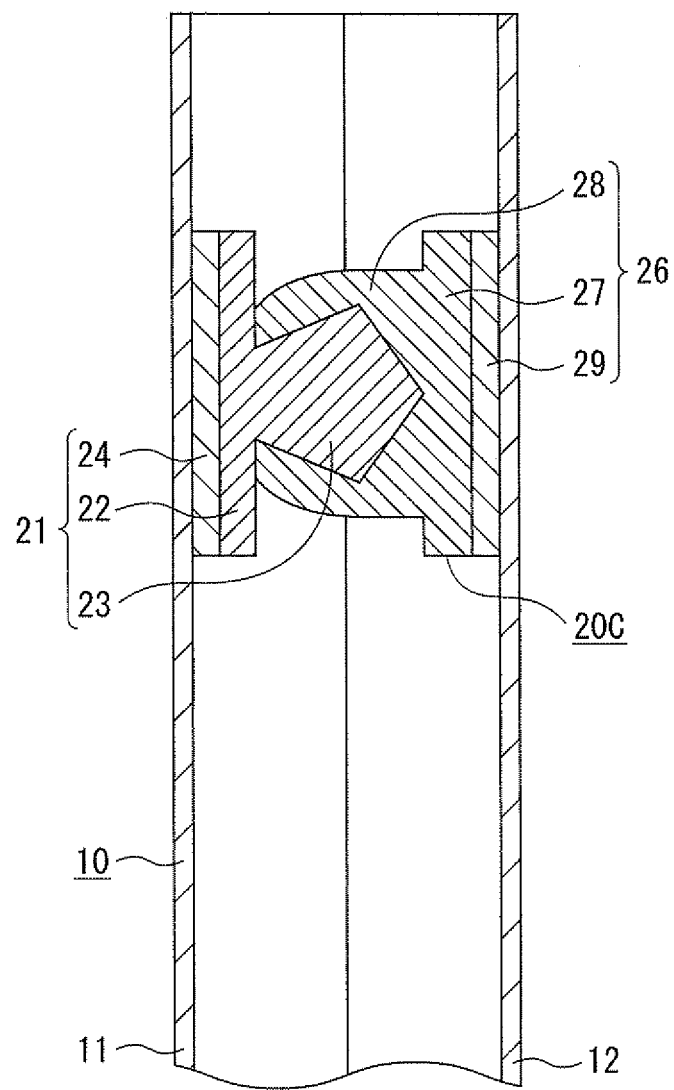
FIG. 7 is a sectional view showing a third embodiment of the present invention.
Figure 8:
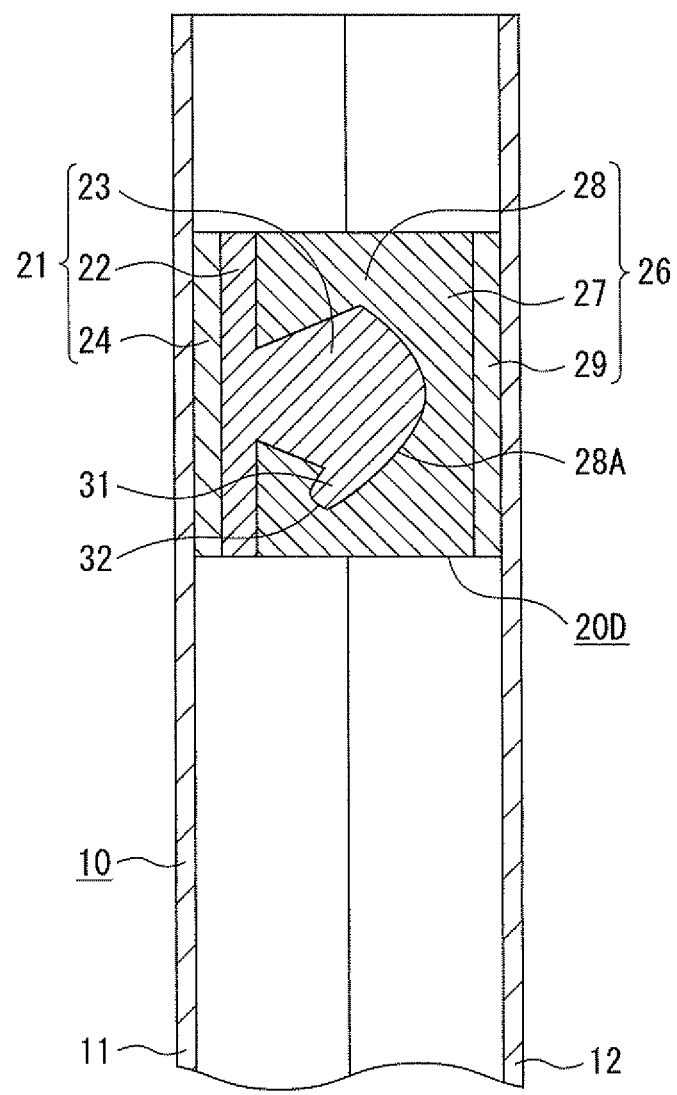
FIG. 8 is a sectional view showing a fourth embodiment of the present invention.

Second to fourth embodiments are shown in FIGS. 6 to 8. In these embodiments, a profile of the male interlocking section 23 of the male member 21 and a profile of the female interlocking section 28 of the female member 26 are different from the profiles in the above-described embodiment.

A zipper 20B (zipper of the second embodiment) shown in FIG. 6 is distinguished in that a profile of the female interlocking section 28 of the female member 26 is formed pentagonal. It should be noted that the male interlocking section 23 of the male member 21 has the same profile as the above embodiment.

A zipper 20C (zipper of the third embodiment) shown in FIG. 7 is distinguished in that a profile of the female interlocking section 28 of the female member 26 is formed inwardly tapered toward a distal end thereof. It should be noted that the male interlocking section 23 of the male member 21 has the same profile as the above embodiments.

A zipper 20D (zipper of the fourth embodiment) shown in FIG. 8 is distinguished from the above embodiments by the male interlocking section 23 of the male member 21 and the female interlocking section 28 of the female member 26.

In this example, the male interlocking section 23 of the male member 21 is arc-shaped, widening in a tapered manner and then narrowing as the distance from the surface (the surface 22B) of the belt-like base 22 increases, and is provided with a hooking section 31 that projects toward the surface (the surface 22B) of the belt-like base 22 at a widthwise side (opposite to the side of the unsealing end). The interlocking groove 28A having a profile that fits with the hooking groove 32 is provided to the hooking section 31 of the female interlocking section 28 of the female member 26.

Such an arrangement ensures higher sealing performance owing to the engagement between the hooking section 31 and the hooking groove 32.

The male member 21 and the female member 26 are each formed of a single resin different from each other, but formation of the members is not limited to this.

For example, the male interlocking section 23 may be formed in two or more layers. A surface layer (a layer contacting with the female interlocking section 28) may be formed of a resin different from a resin that forms the female interlocking section 28. A resin that forms the male interlocking section 23 excluding the surface layer may be the same as the resin that forms the female interlocking section 28.

Conversely, the surface layer of the female interlocking section 28 may be formed of a resin different from the resin that forms the male interlocking section 23. Also, the surface layers of the male interlocking section 23 and the female interlocking section 28 may be formed by resins different from each other, and the portions of the interlocking sections 23 and 28 excluding the surface layers may be formed of the same resin.

A zipper having two or more of the interlocking sections according to the present invention and a zipper having a pair of the interlocking section according to the present invention and a conventional interlocking section are also included in the present invention.

Example (Making of Zipper)

A zipper made in the example is shown in FIG. 5. Materials of the male member 21, the female member 26, and the seal layers 24 and 29 are as follows.

Male member: a propylene copolymer in which the content of ethylene is 1 wt %, the melting point is 154 degrees Celsius, the fusion enthalpy is 72 J/g, and Mw/Mn is 2.6.

Female member: low density polyethylene.

Seal layers: a blend of 80 wt % of Metallocene LL in which the density is 890 kg/m$^3$ and MFR is 3.2 g/10 min and 20 wt % of a propylene-butene-1 copolymer in which the density is 890 kg/m$^3$ and MFR is 3.2 g/10 min.

These three kinds of resins were coextruded by three extruders to provide a zipper in which the male member and the female member are in an interlocked state.

(Making of Bag)

The zipper was heat-fused onto the unsealing portion in two laminated films, that is, a biaxially oriented polyethylene terephthalate film of 12 μm and linear low density polyethylene of 50 μm and the remaining three sides were heat-fused to provide the bag having the zipper.

(Evaluation)

For evaluation, a test to see if the zipper can be peeled by hand or not, a measurement of a peeling strength, a test to see if the zipper can be re-sealed by hand or not, and a measurement of a re-unsealing strength were conducted. Table 1 shows the results of the evaluation.

TABLE 1

| | peeling | | | re-unsealing strength (N/50 mm) | |
| --- | --- | --- | --- | --- | --- |
| | peeling feel | strength (N/50 mm) | refitting feel | unsealing side | content side |
| Example 1 | A | 32 | A | 7 | 10 |

Peeling feel: evaluated as A if capable of being peeled by hand (by pulling the bag apart by hand), and B if not.

Peeling strength: evaluated by a tensile testing machine at a crosshead speed 300 mm/min.

Re-fitting feel: evaluated A if capable of being re-fitted, and B if incapable of being re-fitted.

Re-unsealing strength: evaluated by a tensile testing machine at a crosshead speed 300 mm/min.

The invention claimed is:

1. A zipper, comprising: a male member having a male interlocking section; and
a female member having a female interlocking section that fits with the male interlocking section, wherein
the male member and the female member are peelable by hand and re-fittable, and
at least the male interlocking section or a surface layer thereof and the female interlocking section or a surface layer thereof are in contact with each other substantially over an entire surface thereof and are formed of resins comprised of different major components over the entire surface, with substantially no gap between them, and the male member and the female member are integrally molded in an interlocked state.

2. The zipper according to claim 1, wherein
the male member comprises a belt-like base having a bonding surface and a male interlocking section formed along a belt-wise direction in a manner integrated with and protruding from a surface on a side opposite to the bonding surface of the belt-like base,
the female member comprises a belt-like base having a bonding surface and a groove-shaped female interlocking section formed along a belt-wise direction in a manner integrated with and protruding from a surface on a side opposite to the bonding surface of the belt-like base, and
no less than 60% of a surface of the male member excluding the bonding surface of the male member is contacted with a surface of the female member excluding the bonding surface of the female member with substantially no gap interposed therebetween.

3. The zipper according to claim 2, wherein
a surface of the belt-like base of the male member on the side opposite to the bonding surface is contacted with at least a portion of the female interlocking section of the female member.

4. The zipper according to claim 1, wherein
a cross section of the male interlocking section is substantially the same as a groove cross section of the female interlocking section.

5. The zipper according to claim 1, wherein
a peeling starting section is formed at a boundary surface where the surfaces of the male member and the female member abut with each other.

6. The zipper according to claim 5, wherein
the peeling starting section is a groove provided to one of boundary surfaces where the surfaces of the male member and the female member abut with each other.

7. The zipper according to claim 1, wherein
the peeling strength of the male interlocking section of the male member and the female interlocking section of the female member to be disengaged is between and including 50 N/50 mm and 25 N/50 mm.

8. The zipper according to claim 1, wherein
one of the male member and the female member is formed of an ethylene-based polymer and the other is formed of a propylene-based polymer.

9. The zipper according to claim 1, wherein
a seal layer is provided to a side of the bonding surface of each of the male member and the female member.

10. A bag comprising the zipper according to claim 1, the zipper being provided to an opening of a bag body.

11. A manufacturing method of a zipper according to claim 1, comprising a zipper molding process in which the male member having a male interlocking section and a female member having the female interlocking section that fits with the male interlocking section are integrally molded, the male member and the female member being provided by resins comprised of different major components and being molded in an interlocked state.

12. A manufacturing method of a bag, comprising: providing a zipper according to claim 1 by a zipper molding process in which a male member having a male interlocking section and a female member having a female interlocking section that fits with the male interlocking section are integrally molded, the male member and the female member being provided by resins comprised of different major components and being molded in an interlocked state; and
a bag fabricating process in which the zipper molded in the zipper molding process is heat-fused or adhered onto an opening of a bag body in a continued interlocked state to form the bag.

* * * * *